United States Patent
Dobbs et al.

(10) Patent No.: US 11,921,008 B2
(45) Date of Patent: Mar. 5, 2024

(54) CALIBRATION DEVICE AND SELF-TESTING DEVICE OF A NORMALLY CLOSED SMART WATER SUPPLY CONTROL SYSTEM WITH LEAK DETECTION

(71) Applicant: FLOODPROTECH TECHNOLOGIES INC., Petawawa (CA)

(72) Inventors: Kirk A. Dobbs, Pembroke (CA); Len Shankland, Petawawa (CA)

(*) Notice: Subject to any disclaimer, the term of this patent is extended or adjusted under 35 U.S.C. 154(b) by 63 days.

(21) Appl. No.: 17/704,863

(22) Filed: Mar. 25, 2022

(65) Prior Publication Data

US 2022/0307934 A1     Sep. 29, 2022

Related U.S. Application Data

(60) Provisional application No. 63/167,469, filed on Mar. 29, 2021.

(51) Int. Cl.
| | |
|---|---|
| *G01M 3/00* | (2006.01) |
| *F17D 5/02* | (2006.01) |
| *G01M 3/28* | (2006.01) |

(52) U.S. Cl.
CPC .......... *G01M 3/007* (2013.01); *G01M 3/2815* (2013.01)

(58) Field of Classification Search
CPC .... G01M 3/00; G01M 3/007; G01M 3/26–28; G01M 3/2815; F17D 5/00–02
See application file for complete search history.

(56) References Cited

U.S. PATENT DOCUMENTS

| | | | | |
|---|---|---|---|---|
| 5,526,679 | A * | 6/1996 | Filippi | G01M 3/2892 |
| | | | | 702/140 |
| 7,574,896 | B1 * | 8/2009 | Cooper | G01M 3/2815 |
| | | | | 73/40.5 R |
| 10,697,848 | B1 | 6/2020 | Dobbs | |
| 2017/0044744 | A1 * | 2/2017 | Everhart | G01M 3/2815 |
| 2020/0256042 | A1 * | 8/2020 | Bailey | G01M 3/28 |
| 2021/0018393 | A1 * | 1/2021 | Downey | E03B 7/071 |

* cited by examiner

*Primary Examiner* — Nguyen Q. Ha
(74) *Attorney, Agent, or Firm* — Andrews Robichaud PC; Alessandro Colonnier (57) ABSTRACT

A built-in calibration sub-system of, or an auxiliary device to be used with, a normally closed water supply control system of the type that uses a single pressure sensor and a pressure decay versus time measurement to make volumetric flow determinations for water supply control purposes, including leak detection and flood risk mitigation is provided. The present disclosure provides a system that uses an auxiliary electrically actuated valve and an orifice to cause a controlled flow of water to discharge from a plumbing network over a pre-determined pressure range such that the normally closed water supply control system's microprocessor can calculate the calibration factor it needs that relates change in pressure over time to volumetric flow rate. Methods of calibration and testing of the leak detection feature of a normally closed water supply control system are also provided.

15 Claims, 8 Drawing Sheets

| ORIFICE DIAMETER (INCH) | DISCHARGE VOLUME 60 TO 40 PSIG BLEED DOWN US GALLONS | | | |
|---|---|---|---|---|
| | 0.050 | 0.150 | 0.500 | 1.000 |
| 0.020 | 0.849 | 2.547 | 8.489 | 16.978 |
| 0.025 | 0.541 | 1.624 | 5.412 | 10.824 |
| 0.030 | 0.377 | 1.132 | 3.772 | 7.544 |
| | CALIBRATION SEQUENCE TIME IN MINUTES | | | |

CALIBRATION DEVICE AND SELF-TESTING DEVICE OF A NORMALLY CLOSED SMART WATER SUPPLY CONTROL SYSTEM WITH LEAK DETECTION

CROSS REFERENCE TO RELATED APPLICATION

The present application claims priority to U.S. Provisional Application No. 63/167,469, entitled "Calibration Device and Self-Testing Device of a Normally Closed Smart Water Supply Control System with Leak Detection" filed on Mar. 29, 2021, the contents of which are incorporated herein by reference in their entirety.

FIELD OF THE INVENTION

This disclosure relates generally to systems for leak detection in a plumbing network and more specifically to devices for use with normally closed smart water supply control systems with leak detection.

BACKGROUND OF THE INVENTION

The present disclosure is directed to a built-in sub-system of, or auxiliary device to be used with, a normally closed water supply control (NCWSC) system, such as that disclosed in U.S. Pat. No. 10,697,848 B1, the entirety of which is incorporated herein by reference. Systems, such as the one referenced, use a pressure decay over time measurement to determine if there is likely a leak in the plumbing network that it is connected to and monitoring. To convert a pressure decay over time measurement to a volumetric flow rate to make such a determination, the program of the electronic control module that controls the NCWSC system's electrically actuated valve requires a reference volume—that is, the volume of water that is discharged from the entire plumbing network, at a point that is downstream of the valve, with the valve in its normally closed state, versus a set drop in pressure. Provided the plumbing network downstream of the valve does not physically change, this reference volume need only be determined and entered in the electronic control module's program as a calibration factor once.

At present, implementation of a NCWSC system requires the system's installation technician (which may be the property's owner) to determine the reference volume (Calibration Factor) by discharging the plumbing network of enough water downstream of the NCWSC system's normally closed valve to cause a predetermined pressure drop within the system. The Calibration Factor is then the measure of the resulting volume of discharged water and is subsequently input into the system's electronic control module by the installation technician. This methodology could benefit from improvements in that it is relatively inconvenient, time consuming and vulnerable to operator error. It also requires specific training of the installation technician. It is desirable to have an alternate method of calibrating such systems that overcomes at least these drawbacks.

It would also be desirable to have a convenient method of testing the NCWSC system after calibration to confirm proper operation of the leak detection function.

SUMMARY OF THE INVENTION

In one embodiment of the present disclosure, a calibration device is provided for use with a normally closed water supply control system that uses a normally closed primary electrically actuated valve and a pressure sensor downstream of said valve. The device comprises an inlet conduit, downstream of the primary electrically actuated valve, for diverting water from a main fluid supply through an orifice. The device further comprises an auxiliary electrically actuated valve for selectively causing water to flow through the inlet conduit from the main fluid supply to the orifice. The auxiliary electrically actuated valve of the device is operable by an electronic control module which is programmed to open said auxiliary electrically actuated valve and measure the time it takes the system pressure of the main water supply to decrease from a first predetermined pressure to a second predetermined pressure based on input from the pressure sensor.

The calibration device may have an outlet conduit for diverting water exiting the orifice and the diameter of the outlet conduit may be at least an order of magnitude larger than the diameter of the orifice. The electronic control module may be programmed to store the measured time.

Another embodiment of the present disclosure is directed to a method of calibrating a normally closed water supply control system that uses a normally closed electrically actuated valve and a pressure sensor downstream of said valve. The method comprises the steps of causing an electronic control module to monitor a system pressure of a main fluid supply; diverting fluid from a main fluid supply through an orifice; and causing a preprogrammed subroutine within the electronic control module to run and thereby measure the time it takes the system pressure of the main fluid supply, upstream of the orifice, to decrease from a first predetermined pressure to a second predetermined pressure while fluid is being diverted through the orifice. The method may also comprise recording the measured time within the electronic control module.

Yet another embodiment of the present disclosure is directed to a normally closed water supply control system with a calibration device according to above-described embodiments incorporated therein. That is, a system for distribution of water to a structure comprising a logic-based electronic control module; a primary electrically actuated valve having a normally closed state and connected, upstream, to a main water supply and, downstream, to a distribution system for the structure; a sealed accumulator tank connected downstream to said first electrically actuated valve, the tank being partially filled with water and comprising a flexible member separating a water-filled region from an air-filled region; and a pressure sensor connected to the tank. The electronic control module is in communication with the pressure sensor and the primary electrically actuated valve and is programmed to: determine, based on input from the pressure sensor, a flow rate of the water to the distribution system for the structure; determine whether the flow rate of the water represents an acceptable water demand condition; and, cause the primary electrically actuated valve to open if said determination of an acceptable water demand condition is positive. The system also comprises an inlet conduit, downstream the primary electrically actuated valve, for diverting water from the main water supply through an orifice; and an auxiliary electrically actuated valve for selectively causing water to flow through the inlet conduit from the main fluid supply to the orifice. The auxiliary electrically actuated valve is operable by the electronic control module which is programmed to open the auxiliary electrically actuated valve and measure the time it takes the system pressure of the main water supply to decrease from a first predetermined pressure to a second predetermined pressure based on input from the pressure sensor.

Yet another embodiment of the present disclosure is directed to a method of testing a leak detection feature of a normally closed water supply control system that uses a normally closed electrically actuated valve and a pressure sensor downstream of said valve. The method comprises the steps of causing an electronic control module to monitor a system pressure of a main fluid supply; in response to a pressure reading above an upper threshold pressure, monitoring elapsed time and causing an auxiliary valve to open to divert fluid from a main fluid supply, downstream of the normally closed electrically actuated valve, through an orifice, thereby causing a decrease in system pressure; monitoring for fault condition occurrences; and either causing the auxiliary valve to close and indicating that the leak detection feature is functioning properly, in response to detection of a pre-set number of fault conditions within a pre-set time limit; or, causing the auxiliary valve to close and indicating a system fault, in response to the pre-set time limit expiring in the absence of detection of the pre-set number of fault conditions.

DESCRIPTION OF THE DRAWINGS

FIG. 5a illustrates an example of how the auxiliary auto-calibration device of FIG. 4 may be connected to a NCWSC system;

FIG. 5b illustrates, from an alternate view, the exemplary configuration of FIG. 5a;

DETAILED DESCRIPTION OF THE INVENTION

Figure 1:
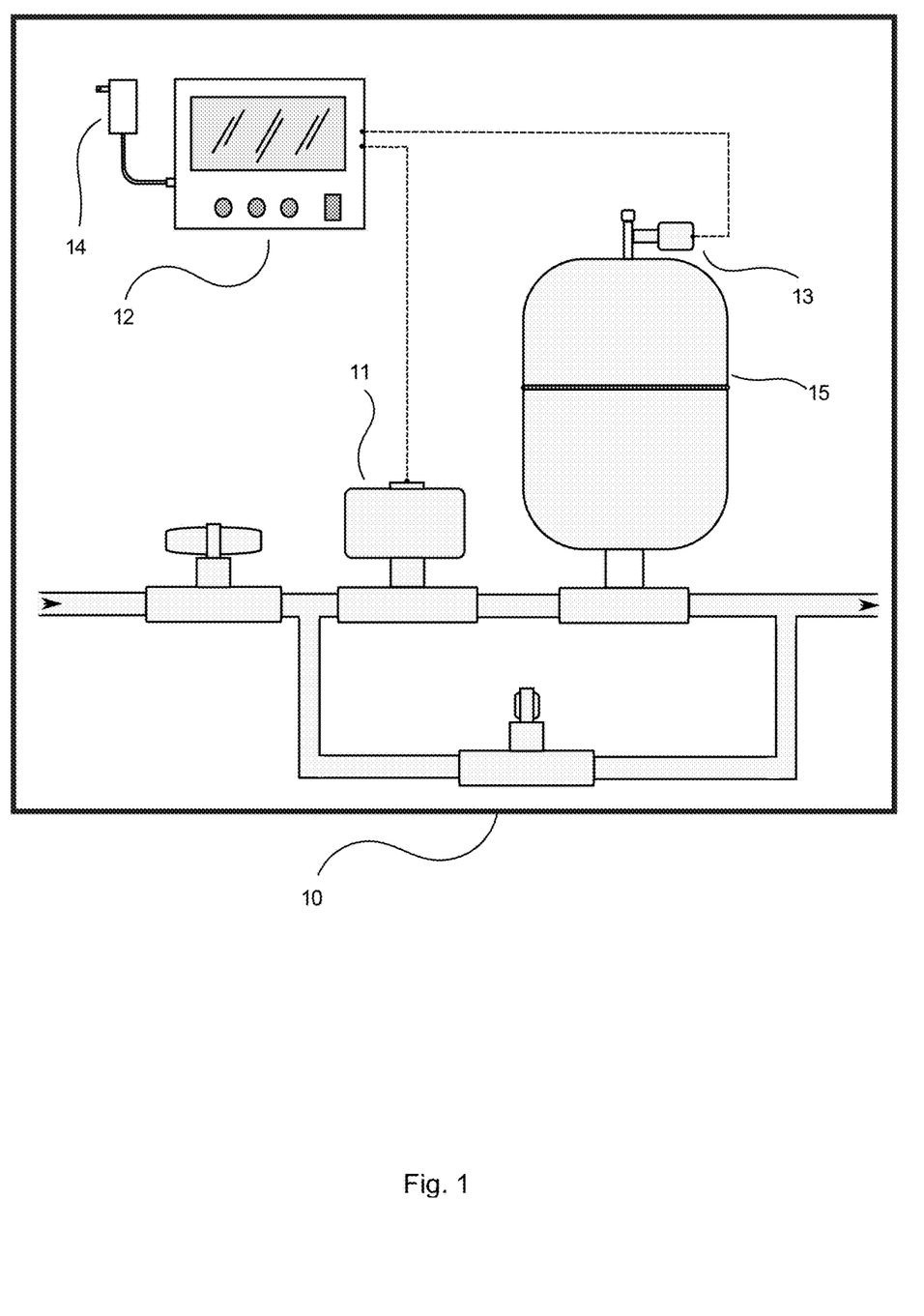
FIG. 1 is a figure from U.S. Pat. No. 10,697,848 B1, representing the elements of the NCWSC described therein.

The calibration device embodiments described in the present disclosure are designed for use with a NCWSC system, such as that described in U.S. Pat. No. 10,697,848B1 and depicted in FIG. 1. The aforementioned NCWSC system 10 uses a normally closed electrically actuated valve 11, to control a building's water supply in a smart way by only supplying water, upon demand, and only if that demand has been determined to be acceptable (i.e. if it is determined that the demand is unlikely to be due to an unanticipated leak in the plumbing network). For the purposes of this disclosure, electrically actuated valve 11 will also be referred to as primary valve 11, so as not to be confused with auxiliary valve 22, which is described below with reference to FIGS. 2 to 5. The leak detecting function of the NCWSC system is facilitated through the use of a pressure decay analysis procedure. The NCWSC system's 10 electronic control module 12 receives a pressure reading from pressure sensor 13, connected to accumulator tank 15, and tracks that reading over time. When valve 11 is in a closed state the pressure will drop whenever demand, of any kind, occurs. The processor in electronic control module 12 measures pressure decay over time, which is directly proportional to a volumetric flow rate, and categorizes the flow rate as being either acceptable demand, or an indication of a potential leak. Electronic control module 12 then starts counting the potential leak events until it confirms that there is high likelihood of a leak in the plumbing network of the building. Upon confirmation, that is, the potential leak count reaches a pre-determined threshold, electronic control module 12 deems this to be a fault condition and disables valve 11 from opening until a system reset is performed.

As mentioned in the background section, electronic control module 12 requires the input of a Calibration Factor that relates to the relationship between change in volume over time and change in pressure over time, and because volume is the variable that differs from one plumbing network to another, it must be determined for each plumbing network to be monitored. The embodiments described in this disclosure offer a novel and inventive way of determining the Calibration Factor for a NCWSC system which is superior to methods currently available.

Figure 2:
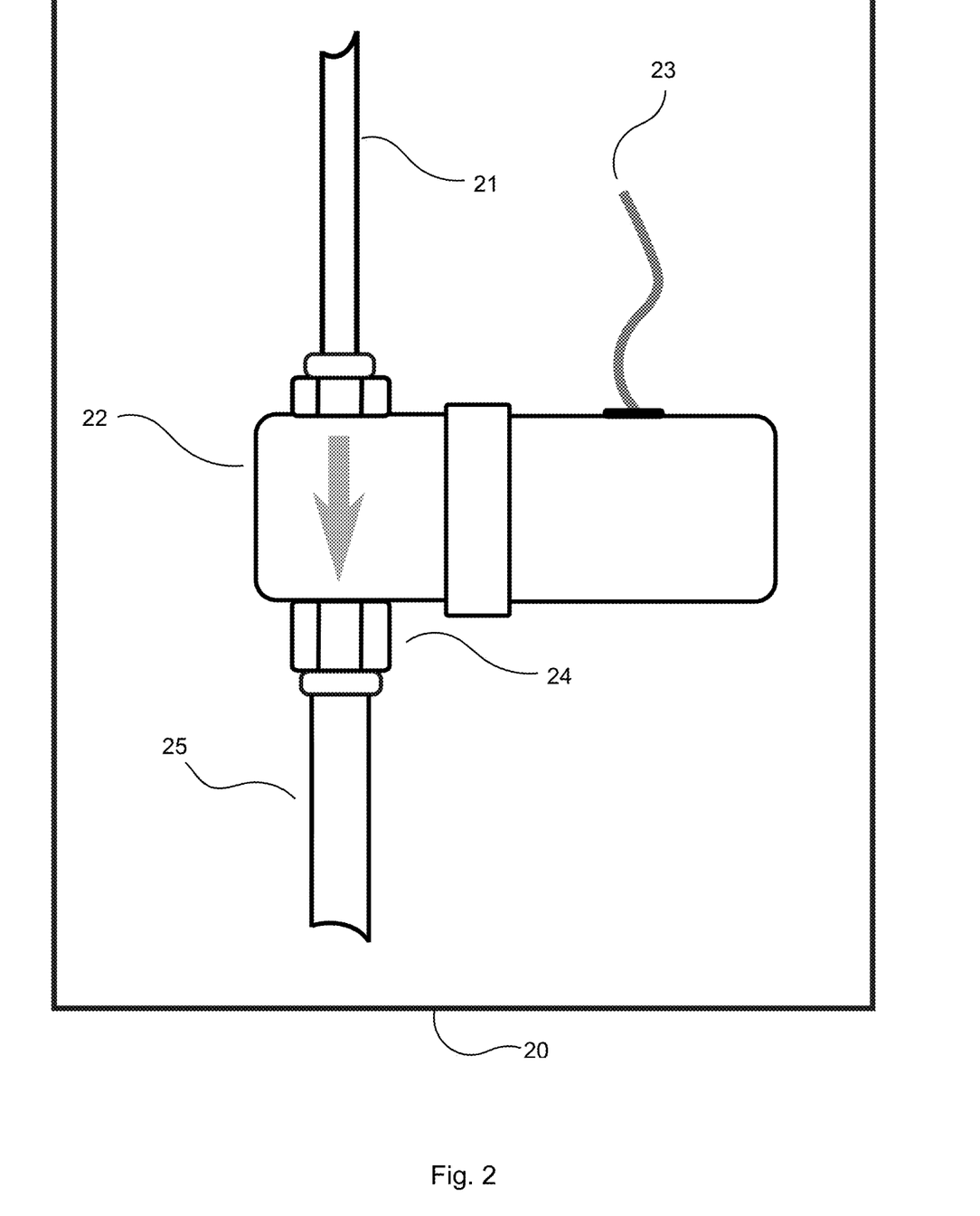
FIG. 2 illustrates the elements of an exemplary auto-calibration device described herein.

An exemplary embodiment of a calibration device 20 according to the present disclosure is shown in FIG. 2. Calibration device 20 has an inlet conduit 21 that is connected to an auxiliary valve 22 (via the valve's inlet port), an orifice 24 that is connected to the auxiliary valve 22 (via the valve's discharge port), an outlet conduit 25 that may be routed to a drain or suitable container, and an electrical connection cable 23. To keep costs to a minimum, inlet conduit 21 and outlet conduit 25 may consist of commercially available pipe suitable for water flow. Similarly, valve 22 may be selected from commercially available valves, such as for example, a Gems Sensor & Controls A Series two-way normally closed solenoid valve. Orifice 24 may be sourced, for example, from O'Keefe Controls' line of precision metal orifices. That line advantageously offers a wide range of sizes and a variety of configurations options. Those skilled in the art will appreciate that products other than those from O'Keefe Controls may alternatively be used for orifice 24, provided they provide an orifice of a fixed diameter and yield a predictable flow rate.

Figure 3:
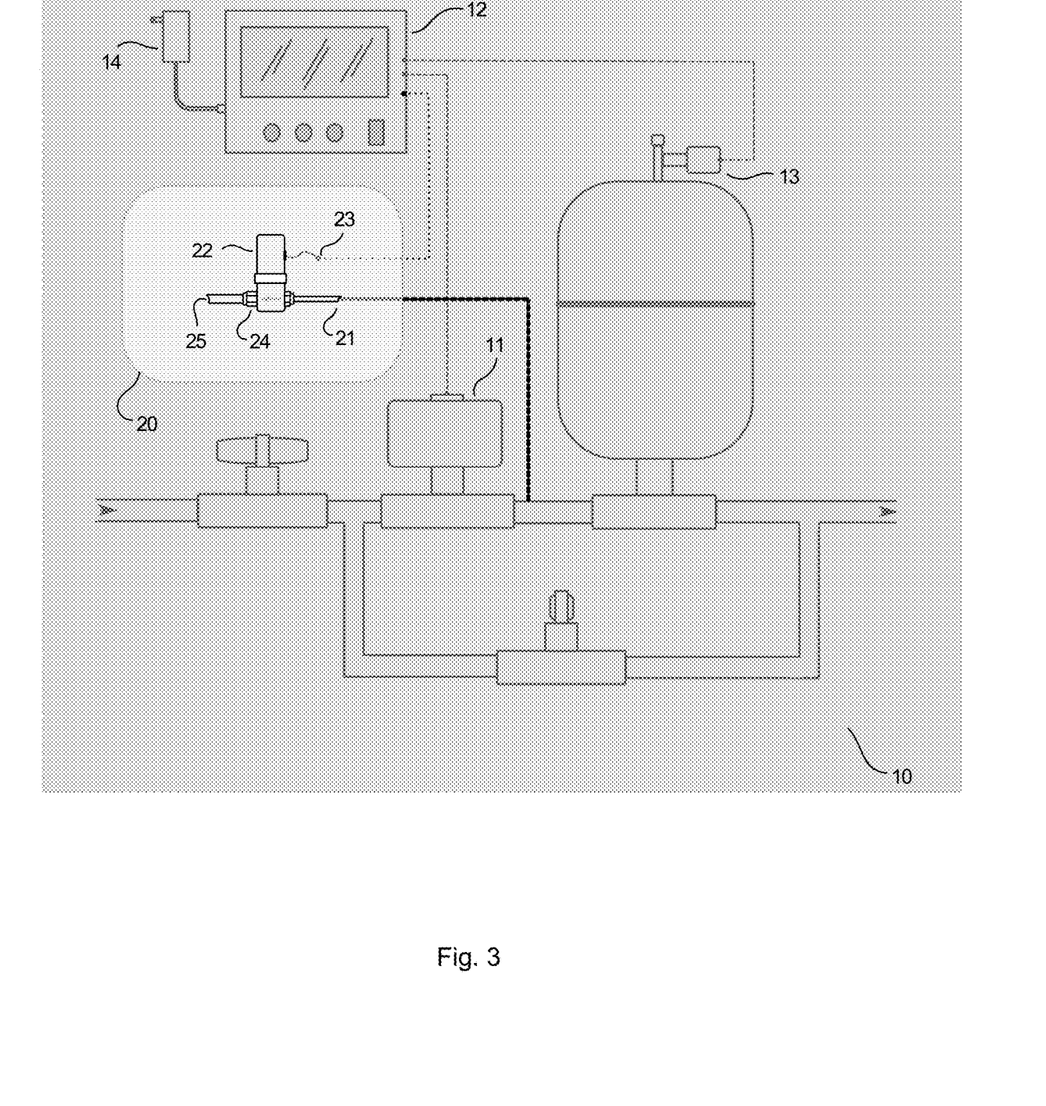
FIG. 3 illustrates the auto-calibration device of FIG. 2 as it may be incorporated into the NCWSC of FIG. 1.

FIG. 3 shows an embodiment where the exemplary calibration device 20 of FIG. 2 is integrated as a built-in sub-system of NCWSC system 10. Inlet conduit 21 is tied into the plumbing network immediately downstream of primary valve 11, and electrical connection cable 23 is tied into the electronic control module 12. A person skilled in the art will appreciate that inlet conduit 21 may be tied into the plumbing network elsewhere provided that its point of connection is downstream of primary valve 11. Auxiliary valve 22 preferably receives its low voltage power (typically 12 VDC) from electronic control module 12 that is powered by power adapter 14.

Figure 4:
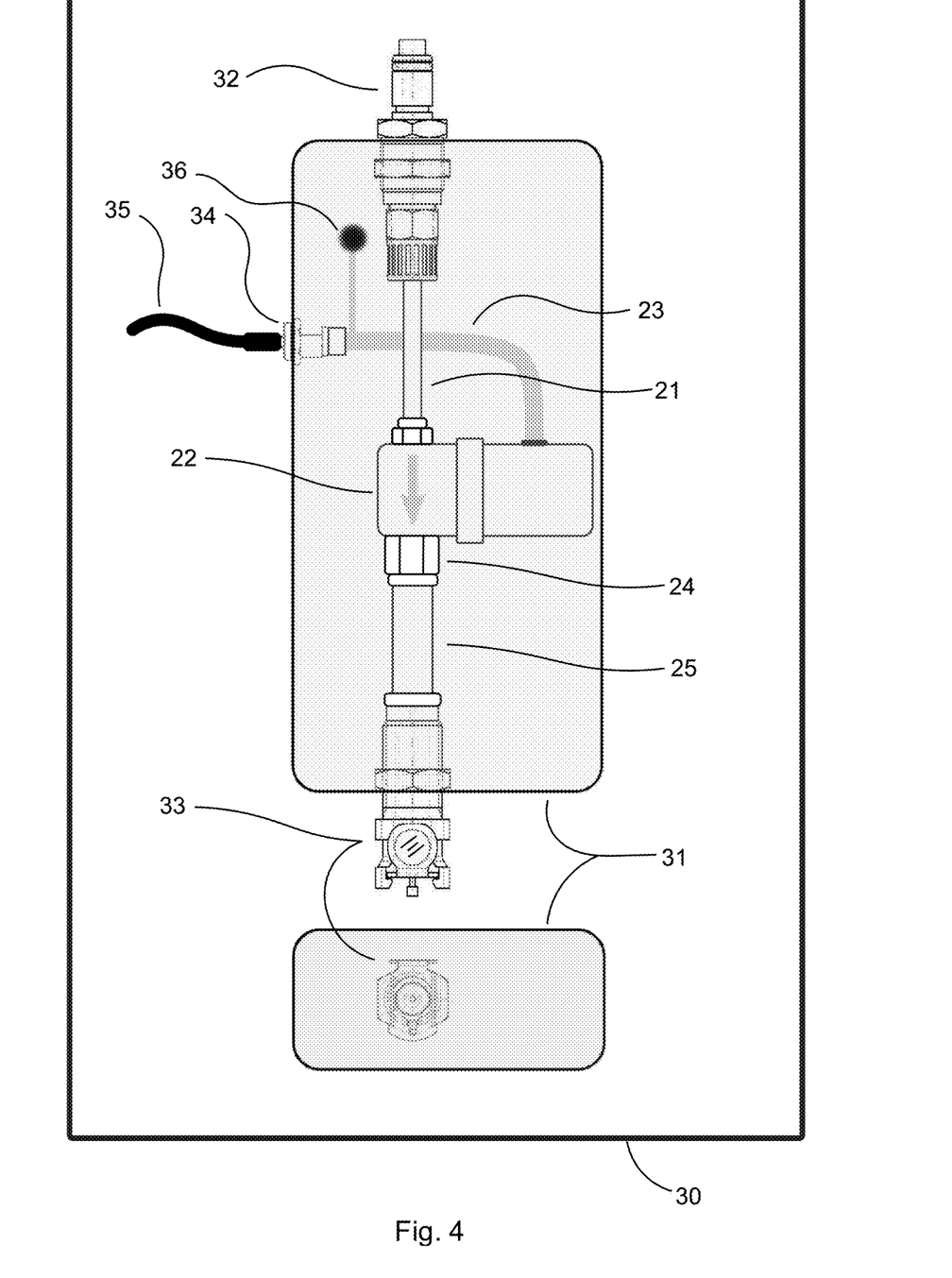
FIG. 4 is combined front and bottom views illustrating the auto-calibration device of FIG. 2 as it may be configured as an auxiliary device for use with a NCWSC system.

FIG. 4 shows an alternative embodiment of a calibration device according to the present disclosure, as part of an auxiliary interface module 30. Interface module 30 features the calibration device shown in FIG. 2 housed in a rugged case 31. Attached to case 31 are inlet and outlet panel-mount quick disconnect fluid couplers, 32 and 33 respectively, that are in turn connected to inlet conduit 21 and outlet conduit 25 respectively. The couplers shown may be commercially available units from Colder Products Company, and it is preferable that both the male and female couplers be valved, in that they be self-opening on connection and self-sealing on disconnection even when under pressure. These couplers offer the advantage of being lightweight, reliable and cost effective. A person skilled in the art would appreciate that alternative couplers may be used. Also attached to case 31 is panel-mount electrical connector 34 that receives power from the NCWSC system's 10 electronic control module 12 via electrical cable 35 to power auxiliary valve 22 via electrical cable 23 that is also connected to electrical connector 34.

Figures 5A, 5B:
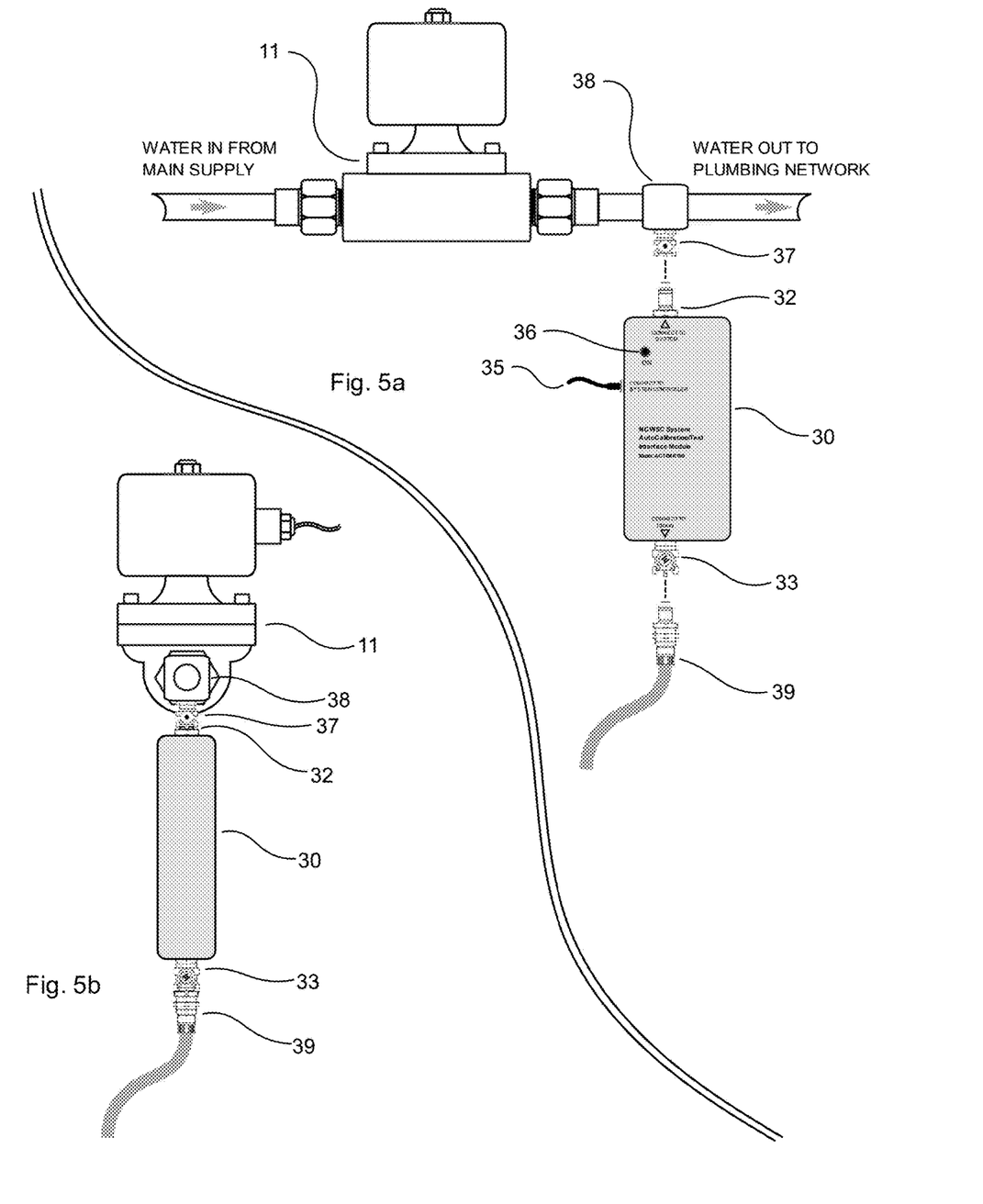

FIGS. 5a and 5b show how interface module 30 may be connected for use with NCWSC system 10. Female coupler 37, which mates with male coupler 32, is housed in fitting 38 that is installed in NCWSC system 10 immediately downstream of primary valve 11. A person skilled in the art will appreciate that fitting 38 with female coupler 37 may be positioned elsewhere within the NCWSC system provided the connection point is downstream of primary valve 11. When interface module 30 is lined up as shown, and male coupler 32 is caused to be inserted into female coupler 37, a fluid path is created from the plumbing network to auxiliary valve 22. Couplers 32 and 37, by design, may lock together such that interface module 30 is able to hang from fitting 38 without any additional support. To complete the fluid path in this exemplary embodiment, drain conduit 39 is provided, complete with its male coupler, and is inserted into female coupler 33. Drain conduit 39 may be routed to a drain or suitable container for catching water discharged from the plumbing network. Electrical connection cable 35 is provided for powering auxiliary valve 22 and connects between electronic control module 12 of NCWSC system 10 and interface module 30. Finally, interface module 30 may be provided with a surface-mounted LED 36, to indicate that power is available to auxiliary valve 22, on command from electronic control module 12.

Figure 7:
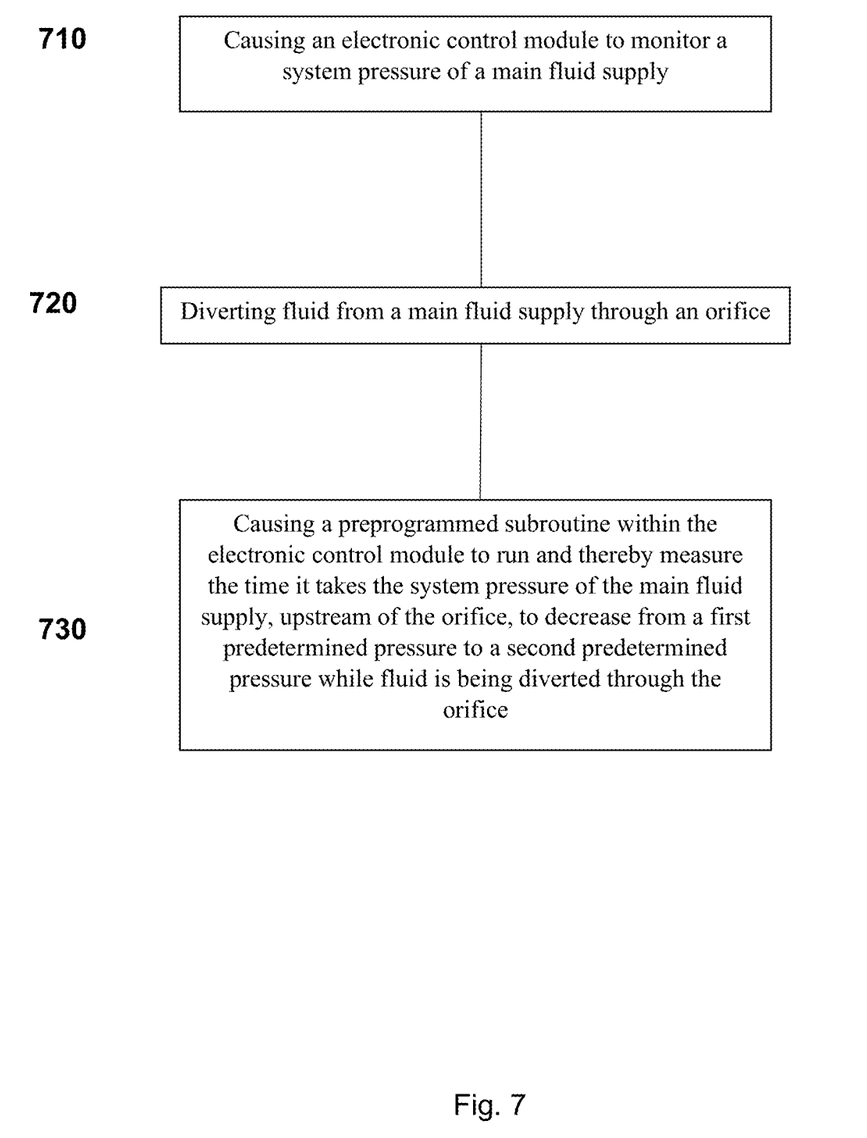
FIG. 7 shows the steps of a method of calibrating a normally closed water supply control system in accordance with an embodiment of the present disclosure.

The practical operation of the exemplary calibration devices described herein will now be described with reference to FIG. 7. The functionality of each embodiment described herein, whether incorporated as part of NCWSC system 10 or used as an auxiliary system, function in the same fashion. An installation or service technician begins the calibration process by setting electronic control module 12 to Calibration Mode which calls up the pre-programmed calibration sub-routine within the electronic control module 12 programming. Electronic control module 12, while monitoring the system pressure of the main fluid supply (step 710), then ensures that the system water pressure is at or above the maximum programmed pressure ($P_{max}$) by commanding primary valve 11 to open if necessary, based on pressure readings from the NCWSC system's pressure sensor. Once electronic control module 12 reads a pressure at or above $P_{max}$, step 720 is initiated and electronic control module 12 commands auxiliary valve 22 to open, thereby diverting fluid from the main fluid supply through orifice 24. Step 730 is then initiated whereby when the system reaches a predetermined upper pressure point (the first predetermined pressure), electronic control module 12 starts an internal timer. Water continues to discharge from the plumbing network, through orifice 24 and preferably out to a drain or catch container, until a predetermined lower pressure point (the second predetermined pressure) is reached. Once the lower pressure point is reached, electronic control module 12 commands auxiliary valve 22 to close and stops the electronic control module's internal timer. The measured time is used by electronic control module 12 to compute the Calibration Factor which is automatically entered into the main program of the electronic control module. For completeness and clarity, we will now outline the derivation of an exemplary Calibration Factor for a plumbing system that uses a $P_{max}$ of 60 psig, a $P_{min}$ of 40 psig, a 0.025 inch diameter orifice 24, which has a discharge coefficient of 0.7, and a measured time T of one minute:

$$V = TQ_{avg} = \text{Calibration Factor}$$

$$V = \frac{1}{60}\text{hr} \cdot \frac{5.543 \text{ gal}}{\text{hr}} = 0.0924 \text{ gal } [US] = 0.350 \text{ liter} = 350 \text{ ml}$$

Using the above formula, the reference volume V (shown in various units)—or Calibration Factor— required by the electronic control module 12 program is determined and automatically entered into the program. As an aside, the volume measured in this example is representative of the plumbing network of a small to average home.

An additional benefit of the exemplary calibration devices described in the present disclosure is that they may be used as a means of performing a test procedure that verifies that NCWSC system 10 is calibrated and functioning properly with respect to leak detection. The testing methodology will now be described with reference to FIG. 8. To perform a leak detection test, the installation technician or property owner may set electronic control module 12 into a Self-Test mode which calls up the pre-programmed test sub-routine within the electronic control module 12 programming. Electronic control module 12 monitors the system pressure (step 810) and ensures that the system water pressure is at or above the maximum programmed pressure ($P_{max}$) by commanding primary valve 11 to open if necessary, based on pressure readings from the NCWSC system's pressure sensor. Once electronic control module 12 reads a pressure at or above $P_{max}$, it begins to monitor elapsed time and commands auxiliary valve 22 to open, thereby diverting fluid from the main fluid supply through orifice 24, which causes a decrease in system pressure (step 820). Meanwhile, the NCWSC system operates as described in U.S. Pat. No. 10,697,848B1, opening and closing primary electrically actuated valve as required to repressurize the fluid network as required. As mentioned earlier, water flow through orifice 24 is, by design, in the region of flow that electronic control module 12 should recognize as a leak condition, so as the pressure in the plumbing network decays, which is visually displayed by electronic control module 12, electronic control module 12 starts its procedure of leak confirmation by counting the number of times it registers and records a flow condition that represents a flow that is a suspected leak (step 830). These leak counts are also displayed by electronic control module 12 for visual confirmation that the leak detecting function is operating correctly. The leak counting continues until either the pre-set leak count limit is reached (typically in the 10 to 30 range, depending on the nature of the plumbing network and the sensitivity desired), or a pre-set time limit has been reached, whichever occurs first (loop 880 encompassing steps 840 and 850). If, at step 840, it is determined that the pre-set number of fault conditions has been detected (before the pre-set time limit has been reached), the system is working as intended and electronic control module 12 alarms to declare a fault condition, and closes auxiliary valve 22 (step 870). In this case (i.e. in Test-Mode), the electronic control module may cause the alarm to be disarmed without human intervention and may communicate to the technician or property owner that the testing feature has completed, the leak detection feature is functioning properly, and the NCWSC system is ready for regular operation.

Figure 8:
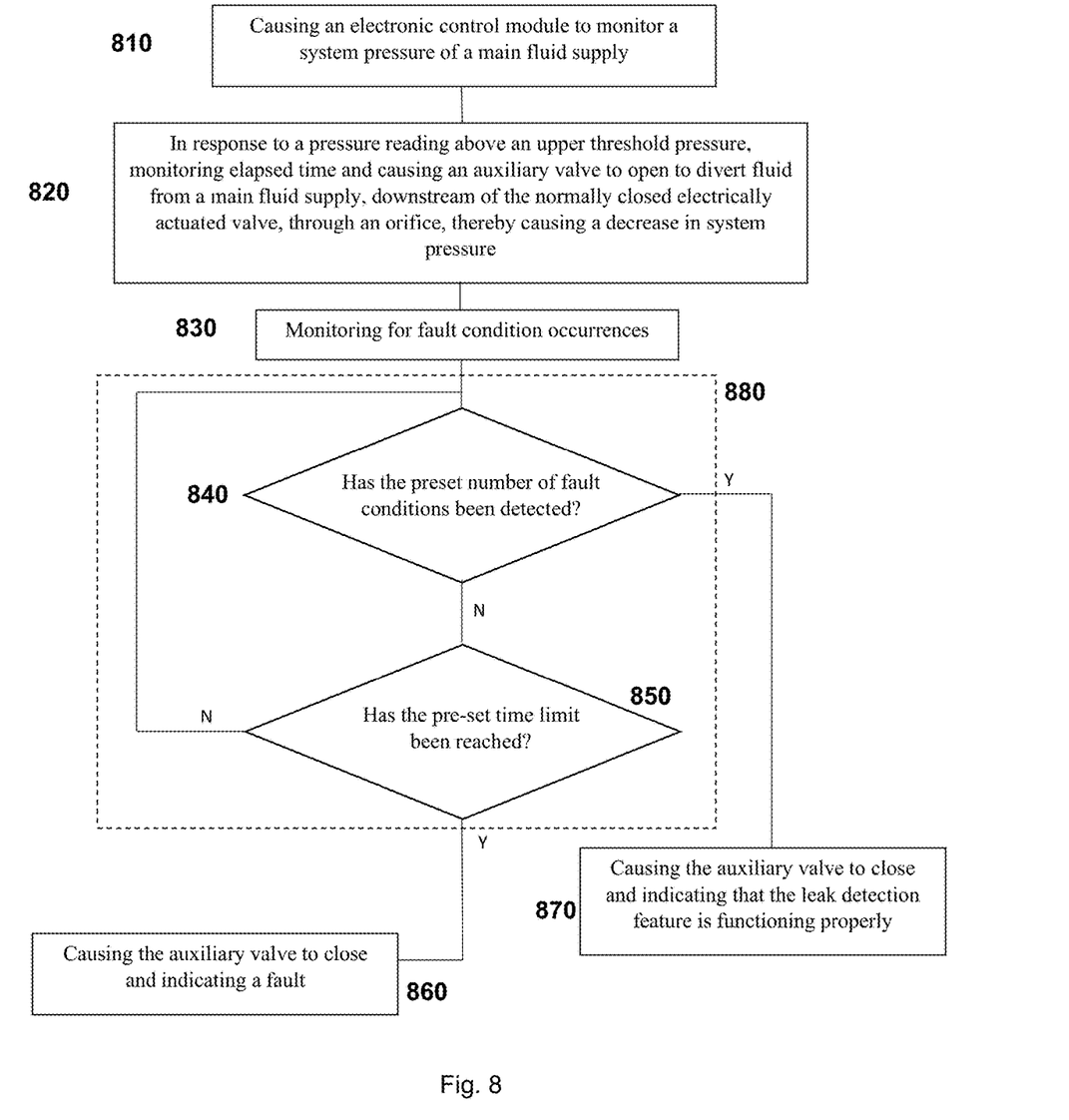
FIG. 8 shows the steps of a method of testing a leak detection feature of a normally closed water supply control system in accordance with an embodiment of the present disclosure.

Alternatively, if, at step 840, it is determined that the pre-set number of fault conditions has not been reached, step 850 is invoked and the electronic control module 12 checks whether the pre-set time limit has been reached. If not, the method loops back up to step 840. If step 850 instead results in a determination that the pre-set time limit has been reached, the electronic control module 12 disables auxiliary valve 22 and indicates a fault (step 860). For example, a message may be displayed on the electronic control module display to the effect that system maintenance is required prior to operation.

Many modifications of the embodiments described herein as well as other embodiments may be evident to a person skilled in the art having the benefit of the teachings presented in the foregoing description and associated drawings. It is understood that any such modifications and additional embodiments are captured within the scope of the contemplated disclosure, which is not to be limited to any of the exemplary embodiments disclosed.

Underlying Formulae and Sample Calculations

The formulae relevant to operation of the various embodiments described in the present disclosure, along with sample calculations, will now be outlined for added clarity.

As described in greater detail above, the calibration procedure described herein involves allowing water to flow out of the plumbing network over a specified pressure drop, at a known flow rate, and measuring the time it takes for this sequence to take place. This time measurement can then be converted back to a volume that will be the Calibration Factor for the NCWSC system.

The volumetric flow rate of a fluid that will flow through an orifice can be calculated using the following equation:

$$Q = 60 C_d \left(\frac{d_o}{0.183}\right)^2 \sqrt{\frac{p_1 - p_2}{SG}}$$

Where:
Q=Fluid flow in gal/hr [US]
Cd=Orifice coefficient of discharge (typically in the 0.6-0.75 range)
$d_o$=Orifice diameter in inches
$p_1$=Primary pressure in psig
$p_2$=Secondary pressure in psig
SG=Specific gravity of the fluid By sizing the diameter of the outlet conduit such that it is much larger than the orifice diameter, by an order of magnitude or more, $p_2$ is negligible compared to $p_1$ and can be assumed to be 0. Given that the fluid is water, which has a specific gravity of 1, the equation can be simplified to:

$$Q = 60 C_d \left(\frac{d_o}{0.183}\right)^2 \sqrt{p}$$

Solving this equation will determine the volumetric flow rate at any given pressure. However, in the context of the present disclosure, the pressure will be constantly declining and therefore, so will the volumetric flow rate. Because the relationship between pressure and volumetric flow rate is linear, an average pressure ($P_{avg}$) may be used. Therefore, our equation can be further simplified to:

$$Q_{avg} = 60 C_d \left(\frac{d_o}{0.183}\right)^2 \sqrt{p_{avg}}$$

Knowing the average flow rate of water through the Orifice, we can use a measured time to back calculate the volume of water discharged over the pressure range, using the following equation, thus deriving the Calibration Factor:

$V = T Q_{avg}$ = Calibration Factor

Where:
V=Volume of water discharged over the pressure range (unit must match $Q_{avg}$)
T=Measured time (unit must match $Q_{avg}$)

The two variables that drive the choice of orifice size are V, the volume of water discharged over a pressure drop (typically from say 60 to 40 psig), and T, the time it will take for the calibration sequence to be performed. Field measurements of the V of a number of homes indicates that this number will vary from around 0.05 to 1 gallon [US] or about 0.15 to 4 litres. Given this rather wide range of V values, to accomplish the calibration task in a reasonable time with good accuracy, an orifice diameter in the range of 0.020 to 0.030 inch is recommended.

The following example is meant to demonstrate how the preferred orifice size and resulting calibration sequence times were arrived at. A sample calculation is provided using a calibration pressure drop from 60 to 40 psig, thereby a $P_{avg}$ of 50, and an orifice diameter, $d_o$ of 0.025 inch, and an orifice discharge coefficient, $C_d$ of 0.7.

$$Q_{avg} = 60 C_d \left(\frac{d_o}{0.183}\right)^2 \sqrt{p_{avg}}$$

$$Q_{avg} = 60 \cdot 0.7 \left(\frac{0.025}{0.183}\right)^2 \sqrt{50}$$

$$Q_{avg} = 5.543 \text{ gal/hr } [US]$$

To continue this sample calculation, we will assume that it takes exactly one minute for the example system to bleed down from 60 to 40 psig, we can calculate the volume V that represents as below.

$$V = T Q_{avg} = \text{Calibration Factor}$$

$$V = \frac{1}{60} \text{hr} \cdot \frac{5.543 \text{ gal}}{\text{hr}} = 0.0924 \text{ gal}$$

Figure 6:
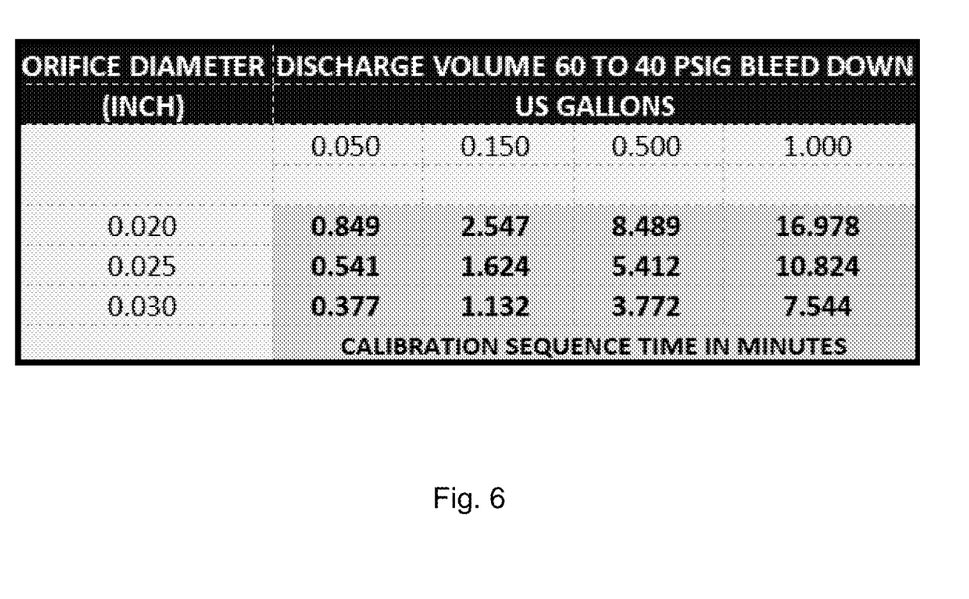
FIG. 6 shows a table of data relating to selection of orifice diameter.

FIG. 6 provides a table showing a range of orifice sizes, volumes and calibration times, all based on using the same values of $P_{avg}$ and $C_d$ as above.

The invention claimed is:

1. A calibration device for use with a normally closed water supply control system that uses a normally closed primary electrically actuated valve and a pressure sensor downstream of said valve, the device comprising:
    an inlet conduit, downstream of the primary electrically actuated valve, for diverting water from a main water supply through an orifice;
    an auxiliary electrically actuated valve for selectively causing water to flow through the inlet conduit from the main water supply to the orifice;

wherein the auxiliary electrically actuated valve is operable by an electronic control module which is programmed to open said auxiliary electrically actuated valve and measure the time it takes a system pressure of the main water supply to decrease from a first predetermined pressure to a second predetermined pressure based on input from the pressure sensor.

2. The calibration device of claim 1 further comprising an outlet conduit for diverting water exiting the orifice.

3. The calibration device of claim 1 wherein a diameter of the outlet conduit is at least an order of magnitude larger than a diameter of the orifice.

4. The calibration device of claim 1, wherein the electronic control module is further programmed to store the measured time.

5. The calibration device of claim 2, wherein the electronic control module is further programmed to store the measured time.

6. The calibration device of claim 3, wherein the electronic control module is further programmed to store the measured time.

7. A method of calibrating a normally closed water supply control system that uses a normally closed electrically actuated valve and a pressure sensor downstream of said valve, the method comprising:
   causing an electronic control module to monitor a system pressure of a main water supply;
   diverting water from the main water supply through an orifice; and
   causing a preprogrammed subroutine within the electronic control module to run and thereby measure the time it takes the system pressure of the main water supply, upstream of the orifice, to decrease from a first predetermined pressure to a second predetermined pressure while water is being diverted through the orifice.

8. The method of claim 7 further comprising recording the measured time within the electronic control module.

9. A system for distribution of water to a structure comprising:
   a logic-based electronic control module;
   a primary electrically actuated valve having a normally closed state and connected, upstream, to a main water supply and, downstream, to a distribution system for the structure;
   a sealed accumulator tank connected downstream to said first electrically actuated valve, said tank being partially filled with said water and comprising a flexible member separating a water-filled region from an air-filled region;
   a pressure sensor connected to said tank,
   said electronic control module being in communication with the pressure sensor and the primary electrically actuated valve;
   the electronic control module programmed to:
      determine, based on input from said pressure sensor, a flow rate of the water to the distribution system for the structure;
      determine whether said flow rate of the water represents an acceptable water demand condition; and,
      cause the primary electrically actuated valve to open if said determination of an acceptable water demand condition is positive,
   wherein the system further comprises:
      an inlet conduit, downstream the primary electrically actuated valve, for diverting water from the main water supply through an orifice; and,
      an auxiliary electrically actuated valve for selectively causing water to flow through the inlet conduit from the main water supply to the orifice;
   wherein the auxiliary electrically actuated valve is operable by the electronic control module which is programmed to open said auxiliary electrically actuated valve and measure the time it takes a system pressure of the main water supply to decrease from a first predetermined pressure to a second predetermined pressure based on input from the pressure sensor.

10. The system of claim 9 further comprising an outlet conduit for diverting water exiting the orifice.

11. The system of claim 9 wherein a diameter of the outlet conduit is at least an order of magnitude larger than a diameter of the orifice.

12. The system of claim 9, wherein the electronic control module is further programmed to store the measured time.

13. The system of claim 10, wherein the electronic control module is further programmed to store the measured time.

14. The system of claim 11, wherein the electronic control module is further programmed to store the measured time.

15. A method of testing a leak detection feature of a normally closed water supply control system that uses a normally closed electrically actuated valve and a pressure sensor downstream of said valve, the method comprising:
   causing an electronic control module to monitor a system pressure of a main water supply;
   in response to a pressure reading above an upper threshold pressure, monitoring elapsed time and causing an auxiliary valve to open to divert water from the main water supply, downstream of the normally closed electrically actuated valve, through an orifice, thereby causing a decrease in system pressure;
   monitoring for fault condition occurrences mimicking water leaks from the main water supply; and
   performing a step selected from the group consisting of:
      in response to detection of a pre-set number of fault condition occurrences within a pre-set time limit, causing the auxiliary valve to close and indicating that the leak detection feature of the control system is functioning properly; and
      in response to the pre-set time limit expiring in the absence of detection of the pre-set number of fault condition occurrences, causing the auxiliary valve to close and indicating that the leak detection feature of the control system is not functioning properly due to a fault in the control system.

* * * * *